United States Patent
Morales et al.

(10) Patent No.: US 7,100,259 B2
(45) Date of Patent: Sep. 5, 2006

(54) METHOD OF METALLIC SANDWICHED FOAM COMPOSITE FORMING

(75) Inventors: Arianna T Morales, Royal Oak, MI (US); Paul E Krajewski, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 271 days.

(21) Appl. No.: 10/738,345

(22) Filed: Dec. 17, 2003

(65) Prior Publication Data

US 2005/0136282 A1 Jun. 23, 2005

(51) Int. Cl.
B23P 17/00 (2006.01)
B21D 39/00 (2006.01)

(52) U.S. Cl. .......................... 29/421.1; 29/458; 29/505; 29/469.5; 72/57; 72/60; 428/613

(58) Field of Classification Search .................. 29/897, 29/897.2, 421.1, 469.5, 525.13, 525.14, 525.15, 29/458, 505; 72/57, 60; 428/551, 565, 621, 428/613; 156/197, 219, 221, 224
See application file for complete search history.

(56) References Cited

U.S. PATENT DOCUMENTS

| | | | | |
|---|---|---|---|---|
| 2,937,938 | A * | 5/1960 | Fiedler et al. ................. | 75/415 |
| 3,028,667 | A * | 4/1962 | Wintermute et al. ....... | 29/469.5 |
| 3,340,714 | A * | 9/1967 | Karl-Heinz Pohl et al. .......................... | 72/342.4 |
| 3,834,881 | A * | 9/1974 | Niebylski .................... | 428/613 |
| 4,821,546 | A * | 4/1989 | Story ............................ | 72/60 |
| 4,833,768 | A * | 5/1989 | Ecklund et al. ............ | 29/421.1 |
| 5,024,368 | A * | 6/1991 | Bottomley et al. ......... | 228/118 |
| 5,449,109 | A * | 9/1995 | Chuang et al. ............. | 228/157 |
| 5,974,847 | A | 11/1999 | Saunders et al. | |
| 6,085,965 | A * | 7/2000 | Schwartz et al. ........... | 228/190 |
| 6,202,276 | B1 * | 3/2001 | Chuang ..................... | 29/421.1 |
| 6,253,588 | B1 | 7/2001 | Rashid et al. | |
| 6,444,330 | B1 * | 9/2002 | Abels ......................... | 428/550 |
| 6,605,368 | B1 * | 8/2003 | Smith ......................... | 428/613 |
| 6,675,621 | B1 * | 1/2004 | Kleber ......................... | 72/60 |

* cited by examiner

Primary Examiner—Jermie E. Cozart
(74) Attorney, Agent, or Firm—Kathryn A. Marra

(57) ABSTRACT

Disclosed is a method of forming metallic composite structures The method utilizes superplastic and quickplastic formation methodologies in conjunction with the use of appended engineered metallic foams to provide energy absorbing materials.

16 Claims, 3 Drawing Sheets

METHOD OF METALLIC SANDWICHED FOAM COMPOSITE FORMING

FIELD OF THE INVENTION

The present invention relates to a method of making metallic composite structures and more specifically, a method for forming metallic composite panels having an interior metallic foam core.

BACKGROUND OF THE INVENTION

A useful method for metal sheet forming is provided in "quickplastic" or "superplastic" ("quick plastic" or "super plastic") forming approaches (QPF or SPF) in which sheet metal is formed into a complex shape in a single-sided forming tool using gas pressure to provide the forming force to transform the sheet metal into a form. In this regard, metal sheets such as aluminum are heated and then formed into shapes using gas pressure. The technology allows complex shapes to be formed from materials otherwise difficult to form to the complex shape. Details in these methods are presented in commonly assigned U.S. Pat. No. 5,974,847 for a "Superplastic Forming Process" issued to Fredrick I. Saunders, et al., on Nov. 2, 1999, and U.S. Pat. No. 6,253,588 for "Quick Plastic Forming Of Aluminum Alloy Sheet Metal" issued to Moinuddin S. Rashid, et al., on Jul. 3, 2001, which are herein incorporated by reference.

In a number of products, such as energy absorbing structures used in transportation vehicles, it would be desirable to form a metal foam portion attached to a formed sheet metal structure so as to form a lightweight compactable structure. The compactable structure would deform at predetermined stress levels when subjected to an impact. Formation of such structures to date has not been feasible due to the cost of formation of the foam portion which needs to be shaped prior to the attachment to the shaped sheet metal. Furthermore, adherence of the shaped foam portion to the shaped sheet metal requires use of an adhesive. The adhesive provides a bond in the composite (between the foam portion and the metal sheet) which has its own properties, thus establishing at least three discrete domains of properties within the composite. The interfacial properties of the adhesive may significantly complicate the design of structures using these materials.

What is needed is a unified and straightforward approach for providing a complex composite structure of a formed metal sheet with a metal foam substrate. Preferably, the composite structure could be formed at low cost in such a manner that the foam does not require significant processing of the foam in the attachment step. The present invention is directed to fulfilling these needs.

SUMMARY OF THE INVENTION

Disclosed is a method for forming a bi-phase metallic composite structure of metallic foam fused to a metal sheet by (a) placing the metallic sheet between a die and a platen. The metallic sheet is subjected to stretch forming by use of differential gas pressure, where the die has a forming surface defining a cavity between the forming surface; (b) adjusting the temperature of the metallic sheet to between a superplastic-forming temperature and a melting temperature of the metallic sheet; (c) applying gas pressure to the sandwich panel to stretch the metal sheet into conformity with the die forming surface; and (d) coupling of metallic foam core to the deformed metallic sheet.

In a further embodiment of the present, the platen has a die with a panel shaping surface opposite the cavity of the first die. Prior to blow-forming with gas pressure, the sheet metal panel material is drawn into the cavity by the shaping surface as the dies close together.

In yet a further embodiment, the above operations are preceded by the positioning of a metal foam core adjacent to the metal sheet. The metal sheet and foam core are heated to a forming temperature sufficient to bring the metallic sheet to its super plastic forming temperature prior to forming.

In yet another embodiment of the present invention, a method for forming foams, and one-sided or two-side sandwiched foam composite structures is disclosed, by (a) placing the foam or sandwiched composite structure between two sections or parts of a die or forming tool and a movable platen between a die open position and a die closed position in which the die and the platen sealingly engage the periphery of the foam or sandwich panel. The die is configured to provide blow forming of foam or a composite sandwich panel by use of differential gas pressure. The die has a forming surface defining a cavity between the forming surface and the foam; (b) adjusting the temperature of the foam or foam sandwich panel to the super plastic forming temperature range; (c) moving the die and platen to their closed position such that the die engages the periphery of the foam or sandwich composite panel; and (d) applying gas pressure to the panel to conform the foam or the sandwiched panel with the die or tool forming surface.

In a further embodiment, the tool lid has a panel shaping surface (preformer, prebender, or stuffer) opposite the cavity of the first half or forming area. Prior to blow-forming with gas or air, the foam or sandwiched composite panel is forced into the cavity by the shaping surface as the die halves close together. In yet a further embodiment, a section of foam is placed between the die forming half and a metallic sheet. In this case, the foam does not extend to the edges of the panel, so it is not locked by the seal beads when the die is closed. The foam is positioned in a location in which greater energy absorption is required. The metallic sheet forms on top and around the foam piece, locking it in the required position, creating a foam reinforcement where needed and in just one forming operation.

The invention provides a basis for producing complex, tough, and "stiff" structures via an essentially single economic forming operation with commensurate benefits in providing low weight composites. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
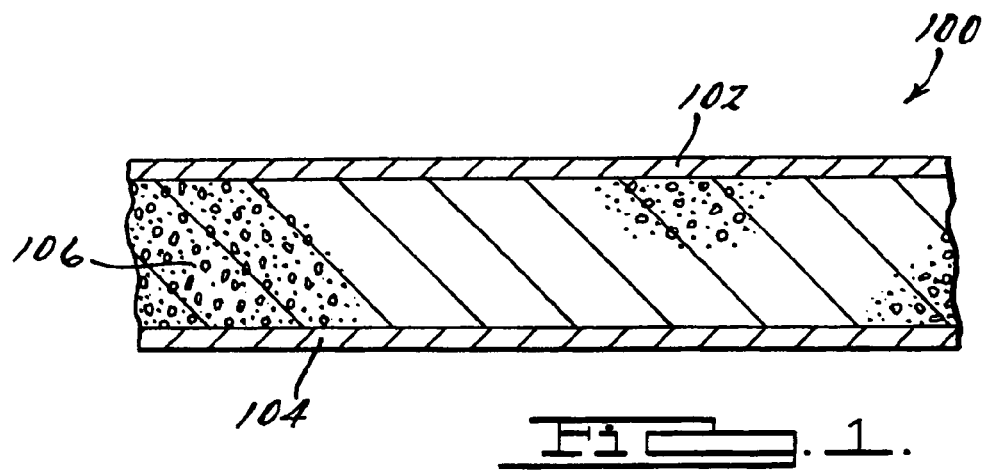
FIG. 1 presents a cross sectional view of a planar sandwich panel.

The following description of the preferred embodiments is merely exemplary in nature and is in no way intended to limit the invention, its application, or uses.

The preferred embodiments involve using superplastic (SPF) or quickplastic (QPF) ("quick plastic" or "super plastic") forming technology approaches in forming a metallic composite structure. In this regard, a planar metal sheet capable of quick-plastic formation is used in the SPF or QPF procedure. During the SPF or QPF process, the temperature of the planar metal sheet is increased so that it is between the super plastic forming temperature and the melting temperature. The sheet metal 102 is deformed using SPF or QPF procedures to form a three dimensional formed metal sheet. The formation of the composite structure occurs either during or after the SPF or QPF of the sheet metal. In this regard, the formation of the metallic composite occurs when a metallic foam layer 106 is coupled to the formed metallic sheet.

The coupling of the metallic foam 106 to the formed metal sheet is accomplished using one of several methodologies. It is envisioned that the metallic foam substrate 106 can be coupled to a quick-plastically formed sheet metal after the plastic deformation of the metal sheet 102. This coupling can be completed by using adhesives or brazing materials which are deposited between the deformed metallic sheet 102 and the foam substrate 106. Additionally, the deformed sheet metal can be formed so as to have a pair of locking interface surfaces which can be elastically deformed so as to engage pair of sculpted surfaces on the foam material.

The metallic foam substrate 106 can also be coupled to the metallic sheet 102 during the super-plastic or quick plastic formation process. In this process the foam material 106 can be coupled to the metal sheet 102 or between a pair of sheets during the structure's formation in the SPF or QPF process. The foam substrate 106 can be sculpted prior to forming, and inserted into a quick plastic formation die with the undeformed sheet metal. During the formation of the composite structure, the sheet metal 102 can be deformed about the sculpted foam 106. This deformation can provide a pair of interface surfaces which engage a corresponding pair of surfaces on the foam substrate 106.

Alternatively, the shape of the foam substructure 106 can be altered or modified during the SPF-QPF processing. While preprocessing of the foam substrate 106 can occur, a portion of the forming or deformation of the foam substrate 106 can take place during the SPF-QPF processing of the sheet metal 102. When the composite structure is formed, the foam substrate 106 can be adhered to the sheet metal 102 by fusion or with the use of brazing material disposed in the construction. In this regard, it is envisioned that the coupling of the foam substrate 106 to the sheet metal 102 can additionally occur by the mechanical interaction with deformed sheet metal surfaces. This fusion coupling eliminates the need for application of an adhesive when manufacturing the panel. Additionally, the use of a fused junction also eliminates the need for managing properties respective to a bonding layer in the composite between the foam portion and the metal sheet during QPF or SPF execution.

Lastly, the foam substrate 106 can be bonded to the sheet-metal prior to the SPF-QPF process. In this regard, a composite panel 100 formed of a laminate sheet of metallic foam 106 with a single sheet of metal 102 or a sheet metal sandwich is provided. By way of non-limiting example, a method for producing metallic foam composite structure using foam panel or sandwich structure is now described. Briefly referring to FIG. 1, a cross-sectional view of a composite panel 100 shows a first sheet 102, and a foam section 106 with the foam section 106 fused to each of the first sheet 102. Preferably, sheet 102 is a metallic sheet of superplasticly formable alloy (for example, without limitation, aluminum AA5083). It is envisioned however that the material can additionally be super plastic grade alloys such as titanium, magnesium, steel, or any other type of material capable of SPF or QPF formation. The metallic foam is preferably high purity aluminum alloy reinforced with a low volume fraction of (~1 micron) ceramic particles. It is envisioned however that the material can additionally be super plastic grade titanium, magnesium, steel, or any other type of material foams and sandwiched foams capable of SPF or QPF formation. The materials chosen for the sandwich panel and the design of the panel are, therefore, defined so that the temperature of the panel environment at the time when QPF or SPF is initiated will enable the metal sheet and the metallic foam section to all have individual temperatures between their respective super plastic temperatures and melting temperatures.

In one embodiment, the composite panel 100 is formed when a metal foam core is positioned against a surface of the first metal sheet 102. Optionally, the second metal sheet 104 is positioned against the other side of the foam core. In one embodiment of the present invention, the composite panel 100 is preformed and is subsequently heated at the time of further processing so that the temperature of the panel is such that each of the first metal sheet 102, the metallic foam 106, and the second metal sheet 104 in the composite panel 100 has a respective temperature between the superplastic-forming temperature and the melting temperature.

Figure 2:
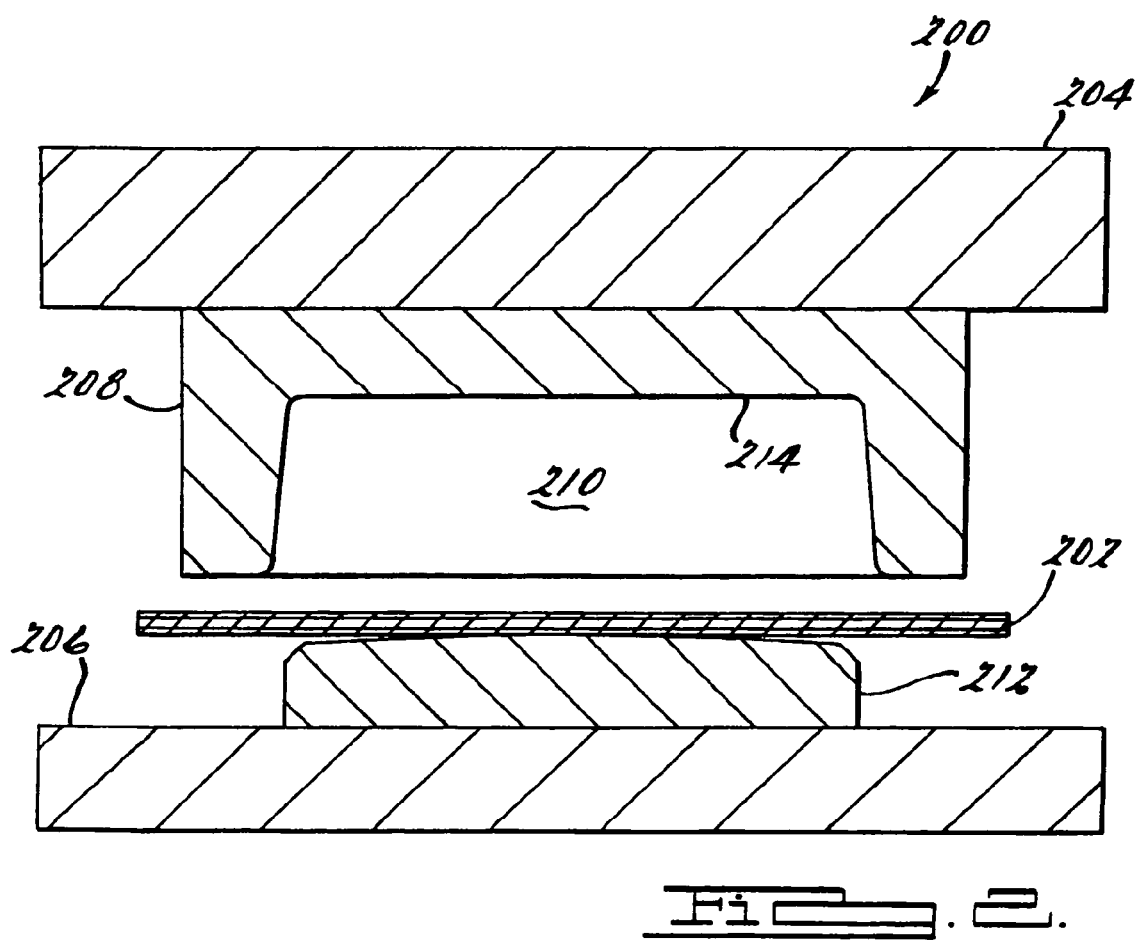
FIG. 2 shows a planar sandwich panel with the cross section of FIG. 1 placed between first and second die members in a die open position.

Turning now to FIG. 2, a sandwich panel 106 (having a cross section such as shown in FIG. 1) is placed between first die member 208 and second die member 212 in die open position. A cavity 210 is defined between forming surface 214 of die member 208 and first metal sheet 102 of panel 100 when die 208 moves to rest against panel 202. First die member 208 is attached to platen 204 and the second die member is attached to platen 206. The temperature of panel 202 is adjusted so that each of the first metal sheet 102, the metallic foam 106, and the second metal sheet 104 in panel 100 is at the blow temperature for the material.

Figure 3:
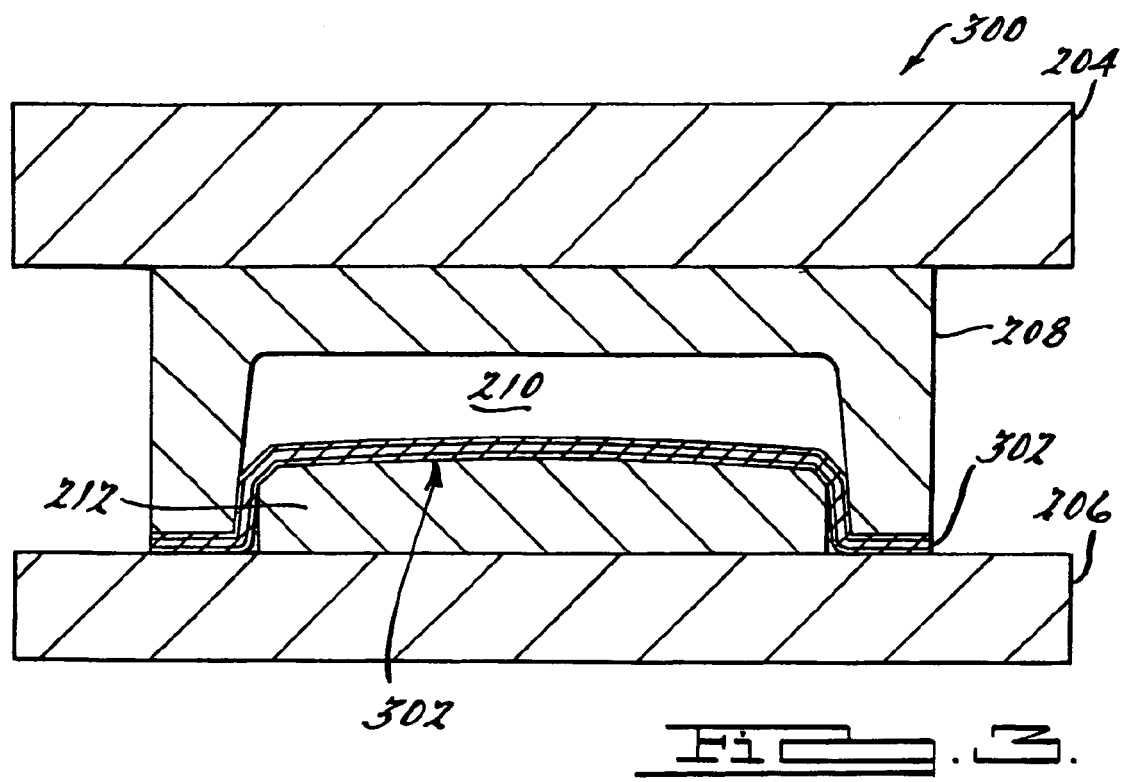
FIG. 3 shows the dies of FIG. 2 in a die closed position with a drawn sandwich panel in the cavity formed between the first and second die members.

Turning now to FIG. 3, die members 208 and 212 of FIG. 2 are depicted in die closed position with the formed sandwich panel 302 in cavity 210. After full closure of die member 208, panel 302, and platen 206, pressurized air or gas, such as nitrogen or argon, is admitted against the second metal sheet 104 of heated drawn panel 302 through a suitable gas passage (not shown) in platen 206 and/or preform 212. Concurrently, gas, in one embodiment, is vented from cavity 210 through vent passages (not shown) of die member 208 or platen 204. Die member 208 and platen 206 grip drawn panel 302 in gas-tight sealing lockbead (not shown) engagement so that suitable gas pressure is maintained on the sandwich material until obtaining full compliance with the forming surfaces 214 of die member 208.

This high pressure blow-forming operation was conducted by gradually increasing the argon pressure to over a period of several minutes. The pressure was then relieved, the dies opened and a completed component was removed. The pan formed completely without splits or significant cavitation.

Figure 4:
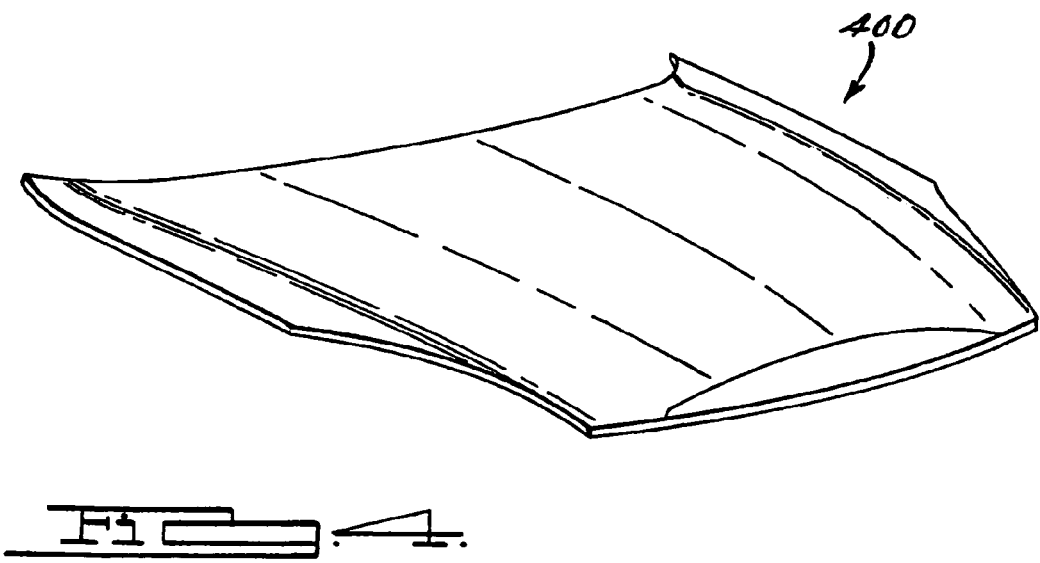
FIG. 4 shows a formed composite made by quick plastic forming of the drawn sandwich panel of FIG. 3.

At the conclusion of blow-forming, that is when panel 302 has been made to fully comply with the forming surfaces 214 of die member 208, the die member 208 and platen 206 open so that the resulting composite structure may be withdrawn and cooled. FIG. 4 shows one embodiment of a composite structure 400 made according to the above described method. In one embodiment, composite structure 400 is cooled below the super plastic temperature of all of shaped first sheet 102, second sheet 104, and foam section 106 before die member 208 and platen 206 open so that composite structure 400 will not distort after removal from die member 208 and platen 206.

Figure 5:
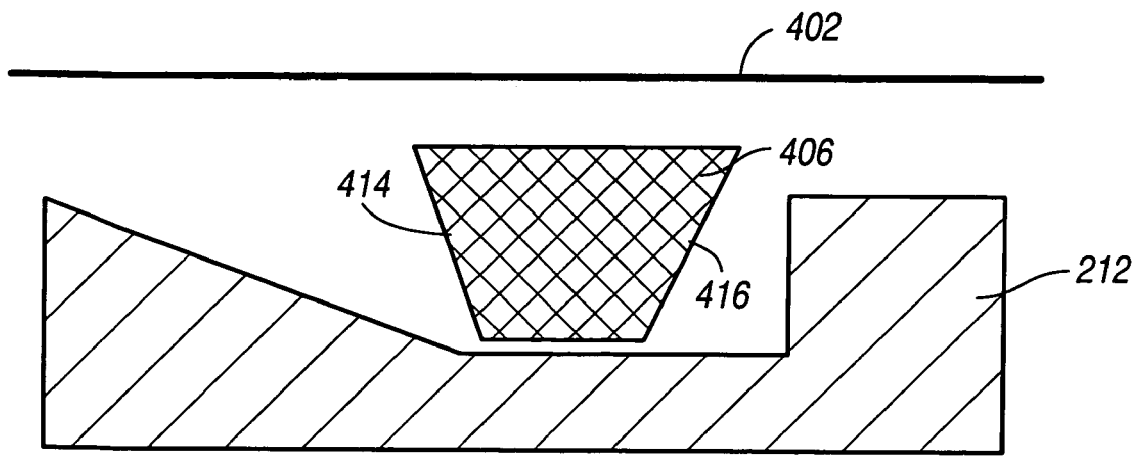
FIGS. 5 and 6 shows the formation of a composite structure according to one embodiment of the present invention.
Figure 6:
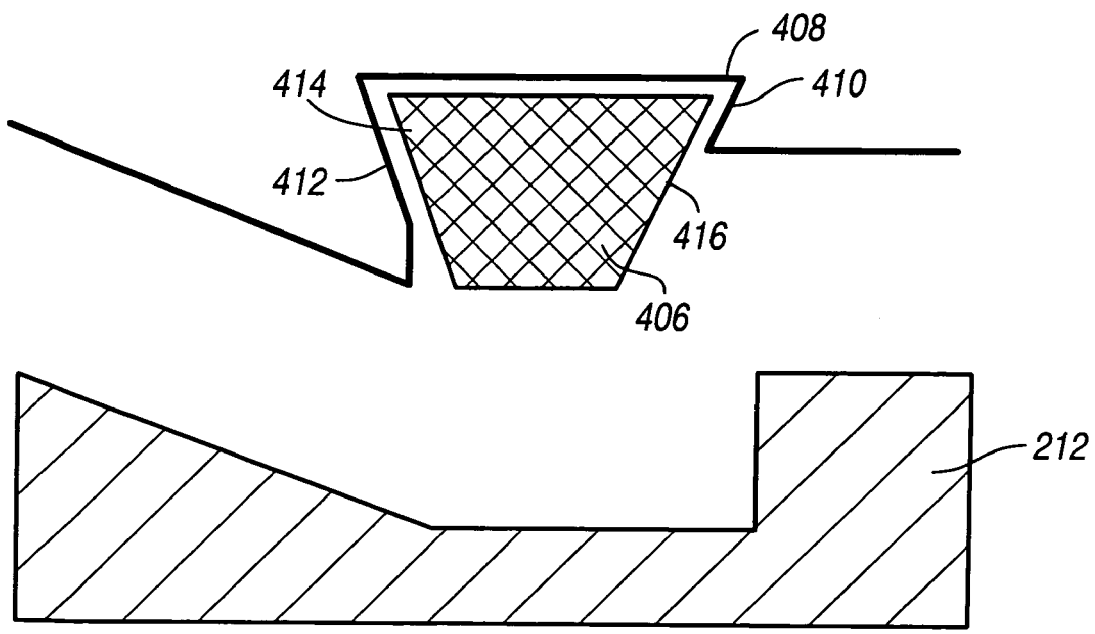

FIGS. 5 and 6 shows the formation of a composite structure 408 according to one embodiment of the present invention. The metallic foam material 406 can also be coupled to the metallic sheet 402 during the super-plastic or quick plastic formation process. In this process the foam material 406 can be coupled to the metal sheet 402 or between a pair of sheets during the structure's formation in the SPF or QPF process. The foam substrate 406 can be sculpted prior to forming, and inserted into a quick plastic formation die 212 with the undeformed sheet metal 402. During the formation of the composite structure 408, the sheet metal 402 can be deformed about the sculpted foam 406. This deformation can provide a pair of interface surfaces 410 and 412 which engage a corresponding pair of surfaces 414 and 416 on the foam substrate 406.

Alternatively, the shape of the foam substrate 406 can be deformed during the SPF-QPF processing. While preprocessing of the foam substrate 406 can occur, a portion of the forming or deformation of the foam substrate 406 can take place during the SPF-QPF processing of the sheet metal 402. When the composite structure is formed, the foam can be adhered to the sheet metal 402 by fusion or with the use of brazing material disposed in the construction. In this regard, it is envisioned that the coupling of the foam substrate 406 to the sheet metal 402 can additionally occur by the mechanical interaction with deformed sheet metal surfaces 410 and 412.

As described herein, superplastic and quickplastic fabrication of one-sided and two-sided sandwiched metallic sheet 100 and foam composites into composites with curvatures provides a unified operation for making composite structures of complex shape sheet with attached metal foam where the foam portion is fused into the metal sheet. The economic forming operation enables manufacture of low weight metal-sheet/metal-foam composites having good impact absorption properties. In this regard, the technology provides a path for enabling the production of ultra-stiff, lightweight panels for automobile body structures and closures. The foam sandwich as formed provides significant stiffness in the manufactured part and, as described, is conveniently and economically formed in a single die or forming tool.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for forming a metallic composite structure, comprising:
   placing undeformed sheet metal between a die and a platen, said die and said platen configured to sealingly engage a periphery of said sheet metal for forming a die enclosed area of the sheet metal, said die having a forming surface defining a cavity between said forming surface and said metal sheet;
   moving said die and platen to their closed position such that said die engages the periphery of said sheet metal;
   adjusting the temperature of said sheet metal to a material blow forming temperature to reduce the density of said metallic composite structure;
   applying positive gas pressure to a surface of the sheet metal so as to superplastically form the sheet metal to at least partially conform with said die forming surface; and
   coupling metallic foam substrate to the sheet metal.

2. The method according to claim 1, wherein coupling metallic foam substrate to the sheet metal occurs prior to applying gas pressure to form the sheet metal.

3. The method according to claim 1, wherein coupling metallic foam substrate to the sheet metal occurs after to applying gas pressure to form the sheet metal.

4. The method according to claim 3, further comprising applying an adhesive between the metallic foam and the sheet metal.

5. The method according to claim 1, wherein coupling metallic foam substrate to the sheet metal comprises deforming the sheet metal to form a pair of interfacial surfaces which couple to a pair of surfaces on the metallic foam.

6. The method according to claim 1, wherein placing sheet metal between a die and a platen comprises placing a metal sheet having a depending metallic foam substrate disposed thereon.

7. The method according to claim 1, wherein placing sheet metal between a die and a platen comprises placing a metal sandwich structure having a first and second sheet metal layers, and coupling a metallic foam substrate comprises positioning a metallic foam layer therebetween.

8. The method according to claim 1, wherein the sheet metal is a superplastically formable alloy.

9. The method according to claim 1, wherein the metallic foam is a superplastically formable alloy.

10. The method according to claim 1, further comprising brazing material between the metallic foam substrate and the sheet metal.

11. The method according to claim 1, wherein the metallic foam is a high purity aluminum alloy reinforced with a low volume fraction of (~1 micron) ceramic particles.

12. A method for superplastically forming a composite metallic foam sandwich structure, comprising:
    arranging a metallic foam substrate between two opposing undeformed metal alloy sheet layers to form a sandwich structure;
    placing said sandwich structure between upper and lower die members configured to sealingly engage at least a periphery of said sandwich structure;
    heating said sandwich structure to a suitable superplastic blow forming temperature to reduce the density of said metallic foam;
    moving said die members to a closed position configured to form a cavity with an enclosed area of at least one of said metal alloy sheet layers; and
    applying positive gas pressure to said at least one metal sheet layer and superplastically blow forming said sandwich structure within said die members.

13. The method according to claim 12, further comprising applying at least one of an adhesive and brazing material between said metallic foam and said metal alloy sheet layers.

14. The method according to claim 12, wherein said metallic foam comprises a high purity aluminum alloy reinforced with a low volume fraction of (~1 micron) ceramic particles.

15. The method according to claim 12, further comprising coupling said metallic foam substrate to said metal alloy sheets prior to applying positive gas pressure and superplastically blow forming said sandwich structure.

16. The method according to claim 15, wherein coupling said metallic foam substrate to said metal alloy sheets comprises deforming at least one of said metal alloy sheets to form a pair of interfacial surfaces configured to couple with a pair of surfaces on said metallic foam substrate.

* * * * *